(12) United States Patent
Li et al.

(10) Patent No.: US 10,404,642 B2
(45) Date of Patent: *Sep. 3, 2019

(54) MESSAGE NOTIFICATION METHOD, SYSTEM, AND DEVICE FOR A COMMUNICATION ACCOUNT

(71) Applicant: Tencent Technology (Shenzhen) Company Limited, Shenzhen (CN)

(72) Inventors: Liangjing Li, Shenzhen (CN); Changqing Yu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/987,758

(22) Filed: May 23, 2018

(65) Prior Publication Data

US 2018/0270182 A1 Sep. 20, 2018

Related U.S. Application Data

(63) Continuation of application No. 14/900,230, filed as application No. PCT/CN2014/079361 on Jun. 6, 2014, now Pat. No. 10,009,307.

(30) Foreign Application Priority Data

Jun. 24, 2013 (CN) .......................... 2013 1 0253001

(51) Int. Cl.
*G06F 15/16* (2006.01)
*H04L 12/58* (2006.01)
(Continued)

(52) U.S. Cl.
CPC .......... *H04L 51/24* (2013.01); *H04L 43/0817* (2013.01); *H04L 51/043* (2013.01); *H04L 67/24* (2013.01); *H04L 67/306* (2013.01)

(58) Field of Classification Search
CPC ....... H04L 67/26; H04L 67/306; H04L 67/02; H04L 67/24; H04L 51/043; H04L 51/32;
(Continued)

(56) References Cited

U.S. PATENT DOCUMENTS 6,567,840 B1 * 5/2003 Binns .................... G06F 9/4887
718/100
8,739,249 B1 * 5/2014 Kay ........................ G06F 21/00
709/217

(Continued)

FOREIGN PATENT DOCUMENTS

CN 102404397 A 4/2012
CN 102571628 A 7/2012

(Continued)

OTHER PUBLICATIONS

Tencent Technology, ISRWO, PCT/CN2014/079361, Sep. 17, 2014, 8 pgs.

(Continued)

*Primary Examiner* — Ruolei Zong
(74) *Attorney, Agent, or Firm* — Morgan, Lewis & Bockius LLP

(57) ABSTRACT

A message notification method for a communication account of a communication platform is performed at a computer server. The method includes identifying a plurality of terminals that are currently logged into the communication account; dividing the plurality of terminals into active terminals and inactive terminals in accordance with their respective operation status information; acquiring, by the communication platform for each of the active terminals, a (Continued)

time difference between a receiving time at which the communication platform receives the operation status information sent by the corresponding active terminal and a time at which the communication platform needs to send a message to the communication account at the corresponding active terminal; and configuring, by the communication platform for each of the active terminals, first notification instruction information according to the corresponding time difference.

18 Claims, 5 Drawing Sheets

(51) Int. Cl.
*H04L 12/26* (2006.01)
*H04L 29/08* (2006.01)

(58) Field of Classification Search
CPC ..... H04L 51/24; H04L 51/36; H04L 12/1895; H04L 43/0817; H04L 63/08; H04L 29/06; H04W 68/00
USPC .......................................................... 709/206
See application file for complete search history.

(56) References Cited

U.S. PATENT DOCUMENTS

| | | | |
|---|---|---|---|
| 2004/0107236 A1* | 6/2004 | Nakagawa | G06F 16/275 709/200 |
| 2007/0060096 A1 | 3/2007 | Hayakawa | |
| 2009/0172103 A1 | 7/2009 | Tuli | |
| 2012/0076152 A1* | 3/2012 | Mansharamani | G06F 9/546 370/413 |
| 2013/0325922 A1* | 12/2013 | Chaudhri | G06Q 10/10 709/203 |

FOREIGN PATENT DOCUMENTS

| | | |
|---|---|---|
| CN | 102883285 A | 1/2013 |
| CN | 103313216 A | 9/2013 |
| JP | 2007068119 A | 3/2007 |
| JP | 2007081759 A | 3/2007 |
| JP | 2008028773 A | 2/2008 |

OTHER PUBLICATIONS

Tencent Technology, IPRP, PCT/CN2014/079361, Dec. 29, 2015, 6 pgs.
First CNOA 201310253001.2, Dec. 2, 2014, 8 pgs.

* cited by examiner

MESSAGE NOTIFICATION METHOD, SYSTEM, AND DEVICE FOR A COMMUNICATION ACCOUNT

CROSS-REFERENCE TO RELATED APPLICATIONS

This application is a continuation application of U.S. patent application Ser. No. 14/900,230, entitled "MESSAGE NOTIFICATION METHOD, SYSTEM, AND DEVICE FOR A COMMUNICATION ACCOUNT", filed Dec. 21, 2015, which is a 371 National Phase application of PCT/CN2014/079361, filed on Jun. 6, 2014, which claims the benefit of and priority to Chinese Patent Application No. 201310253001.2, filed Jun. 24, 2013 by Tencent Technology (Shenzhen) Co., Ltd. and entitled "METHOD FOR PUSHING APPLICATION CONTENT AND RELATED DEVICE AND SYSTEM", all of which are incorporated herein by reference in their entirety.

TECHNICAL FIELD

The disclosure generally relates to the field of communication and, more particularly, to a message notification method, system, and device for a communication account.

BACKGROUND

With the development of communication technology, many communication accounts can support multiple terminals to log in a communication platform simultaneously. That is, several terminals can log in the communication platform using the same communication account. In practical application, one or more of the terminals may be active terminals that are currently used by the user. In the conventional technology, when the communication platform sends a message to the communication account, a notification will be displayed on all the terminals. That is, it is impossible to output different notifications by terminals having different statuses.

SUMMARY

In accordance with the disclosure, there is provided a message notification method for a communication account of a communication platform performed at a computer server having one or more processors and memory storing a plurality of executable instructions to be performed by the one or more processors. The method includes identifying a plurality of terminals that are currently logged into the communication account; detecting operation status information of the plurality of terminals; dividing the plurality of terminals into active terminals and inactive terminals in accordance with their respective operation status information; acquiring, by the communication platform for each of the active terminals, a time difference between a receiving time at which the communication platform receives the operation status information sent by the corresponding active terminal and a time at which the communication platform needs to send a message to the communication account at the corresponding active terminal; and configuring, by the communication platform for each of the active terminals, first notification instruction information according to the corresponding time difference, wherein a strength of a notification message output at the corresponding active terminal as instructed by the corresponding first notification instruction information is inversely proportional to the corresponding time difference.

Also in accordance with the disclosure, there is provided a computer server having one or more processors, memory coupled to the one or more processors, and a plurality of executable instructions stored in the memory that, when executed by the one or more processors, cause the computer server to perform a message notification method for a communication account of a communication platform as described above.

Also in accordance with the disclosure, there is provided a non-transitory computer readable storage medium storing a plurality of executable instructions that, when executed by a computer server having one or more processors, cause the one or more processors to a message notification method for a communication account of a communication platform as described above.

Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Embodiments consistent with the disclosure include a message notification method, system, and device for a communication account.

Consistent with the disclosure, a terminal can be any communication device, such as, for example, a smart device having network functions, e.g., a tablet computer, a mobile phone, an e-reader, a remote controller, a personal computer (PC), a laptop computer, automotive equipment, a network television, or a wearable device. A communication account can be, for example, an instant messaging account, a social network service (SNS) account, a mobile phone number, or an email address, that is used to uniquely identify a communication user. A communications platform can be a server in a communication system, or an independent device other than the server and the terminal.

Figure 1:
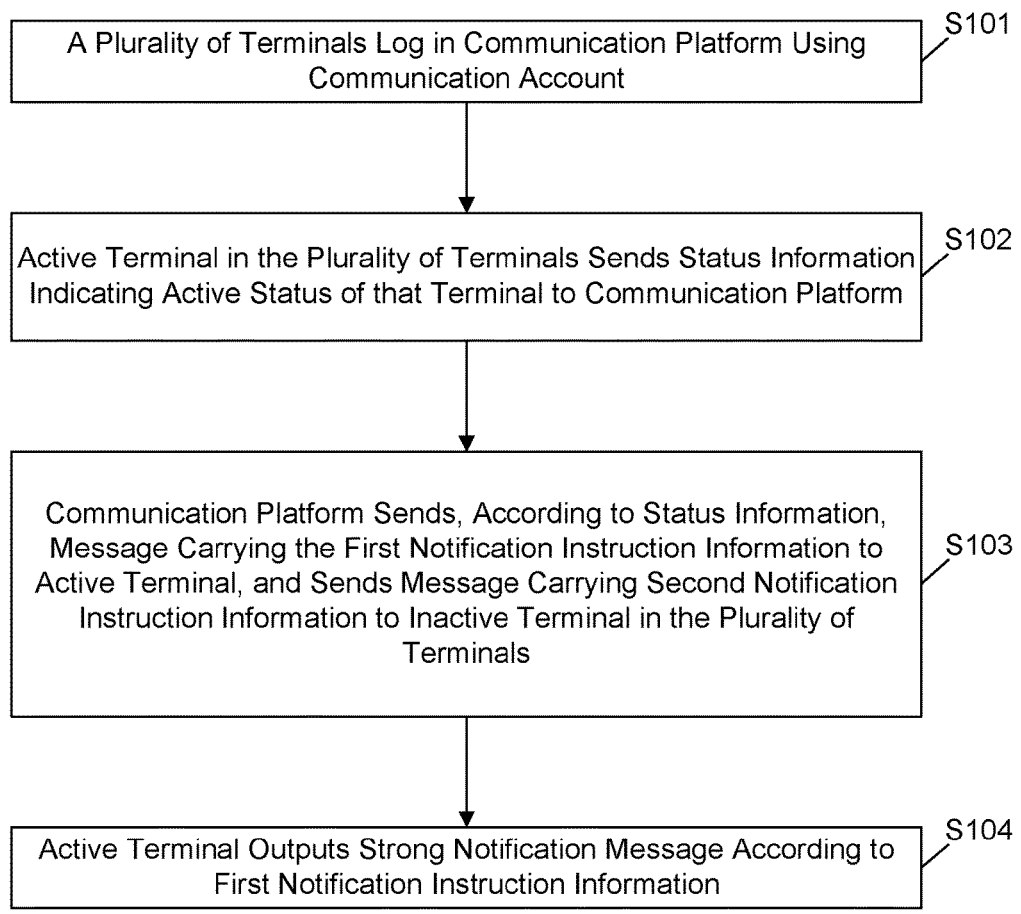
FIG. 1 shows a flow diagram of a message notification method for a communication account according to an exemplary embodiment.

FIG. 1 shows a flow diagram of an exemplary message notification method for a communication account consistent with embodiments of the disclosure. As shown in FIG. 1, at S101, a plurality of terminals log into the communication platform using the communication account.

At S102, among the terminals, an active terminal sends status information to the communication platform. The status information indicates that the status of the active terminal is an active status.

Specifically, the active terminal can be a terminal that may be currently used by the user such as, for example, a terminal whose screen is not locked, a terminal in a full-screen operation, a terminal with a communication client unlocked, or a terminal that receives an operation input by the user within a preset period of time.

In some embodiments, each of the plurality of terminals individually determines whether it is active. If so, the terminal sends the communication platform the status information indicating the terminal is active. As noted above, various methods can be used to determine whether the terminal is active. For example, it is checked whether the screen of the terminal is locked. If so, the terminal is determined to be an inactive terminal. If not, the terminal is determined to be an active terminal. As another example, it is checked whether the terminal is in a full-screen operation. If so, the terminal is determined to be an active terminal. If not, the terminal is determined to be an inactive terminal. As a further example, it is checked whether the communication client on the terminal is locked. If so, the terminal is determined to be an inactive terminal. If not, the terminal is determined to be an active terminal. As a still further example, it is checked whether the terminal has received an operation input by the user within a preset period of time (e.g., 5 minutes, etc.). If so, the terminal is determined to be an active terminal. If not, the terminal is determined to be an inactive terminal.

In some embodiments, determining whether the terminal is active and sending the above status information to the communication platform can be performed periodically. For example, the status of the terminal is checked every 5 minutes. When the terminal is determined to be active, the above status information is sent to the communication platform.

At S103, when the communication platform needs to send a message to the communication account, the communication platform sends the message according to the status information. That is, the message sent to an active terminal carries first notification instruction information instructing to output a strong notification message, and the message sent to an inactive terminal carries second notification instruction information instructing to output a weak notification message or to not output a notification message.

The above message sent to the terminals can be a message that the communication platform needs to send to the above-mentioned communication account, e.g., a system message, or can be a message forwarded by the communication platform from another communication account to the above-mentioned communication account.

In some embodiments, the above inactive terminal is a terminal that may not currently be used by the user, or a terminal that has not sent the above status information to the communication platform within a preset period of time (e.g., 10 minutes, etc.). For example, the inactive terminal can be a terminal whose screen is locked, a terminal not in a full-screen operation, a terminal with a communication client locked, or a terminal that has not received an operation input by the user within a preset period of time. In some embodiments, the above inactive terminal may also be an active terminal before the procedure in S102, at which time such terminal can still send the above status information to the communication platform. That is, the communication platform may have received status information from a terminal that was active but is currently inactive. When the communication platform needs to send a message to the communication account, it may also determine whether a terminal is active or inactive according to the time at which the terminal sends the status information. For example, a terminal that has sent the status information within the preset period of time is determined to be an active terminal, while a terminal that did not send the status information within the preset period of time is determined to be an inactive terminal.

In some embodiments, the strong notification message has a greater notification effect to the user than the weak notification message. The strong notification message may consume larger power than the weak notification message. For example, the strong notification messages may include a window notification, a sound notification, a text notification, and an image notification. That is, the strong notification message may include a simultaneous output of a window notification, a sound notification, a text notification, and an image notification, etc. The weak notification message can be just a text notification or an image notification. That is, the weak notification message only outputs a text notification or an image notification.

At S104, the active terminal outputs the strong notification message according to the first notification instruction information carried in the message. That is, when receiving the message, the active terminal acquires the first notification instruction information, and outputs the strong notification message according to the first notification instruction information. For example, the active terminal outputs a window notification, a sound notification, a text notification, an image notification, and etc. In some embodiments, one or more terminals are active.

As described above, an active terminal sends status information to the communication platform. The status information indicates that the terminal is active. That is, the status of an active terminal is an active status. According to the received status information, the communication platform sends the message that carries the first notification instruction information to the active terminal, and sends the message that carries the second notification instruction information to the inactive terminal in the plurality of terminals. The active terminal outputs the strong notification message according to the first notification instruction information. Therefore, consistent with the disclosure, terminals having different statuses can output different notification messages.

Figure 2:
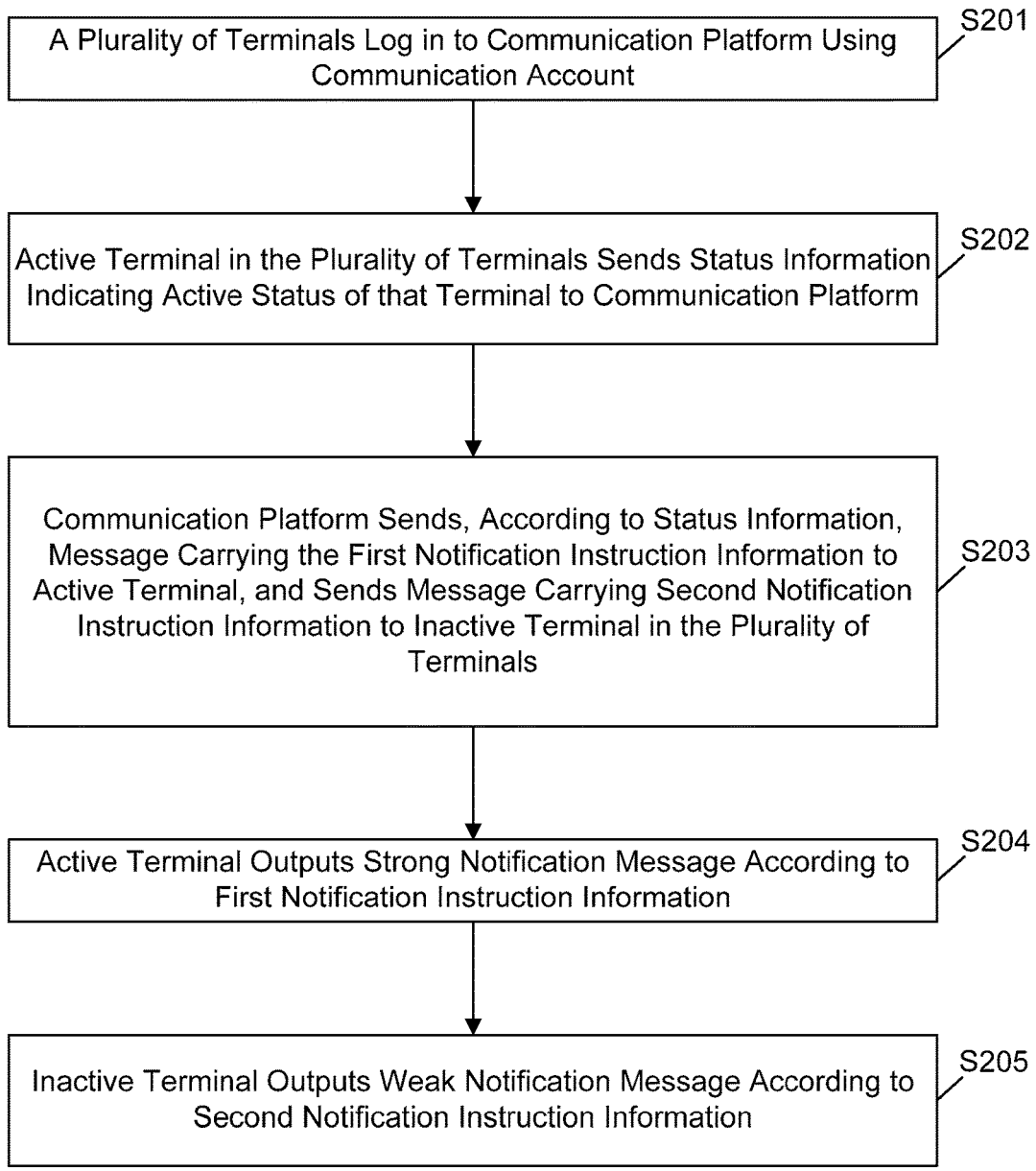
FIG. 2 shows a flow diagram of a message notification method for a communication account according to another exemplary embodiment.

FIG. 2 shows a flow diagram of another exemplary message notification method for a communication account consistent with embodiments of the disclosure. As shown in FIG. 2, at S201, a plurality of terminals log into the communication platform using the communication account.

At S202, among the terminals, an active terminal sends status information to the communication platform. The status information indicates that the status of the active terminal is an active status.

Specifically, the active terminal can be a terminal that may be currently used by the user such as, for example, a terminal whose screen is not locked, a terminal in a full-screen operation, a terminal with a communication client unlocked, or a terminal that receives an operation input by the user within a preset period of time.

In some embodiments, each of the plurality of terminals individually determines whether it is active. If so, the terminal sends the communication platform the status information indicating the terminal is active. As noted above, various methods can be used to determine whether the terminal is active. For example, it is checked whether the screen of the terminal is locked. If so, the terminal is determined to be an inactive terminal. If not, the terminal is determined to be an active terminal. As another example, it is checked whether the terminal is in a full-screen operation. If so, the terminal is determined to be an active terminal. If not, the terminal is determined to be an inactive terminal. As a further example, it is checked whether the communication client on the terminal is locked. If so, the terminal is determined to be an inactive terminal. If not, the terminal is determined to be an active terminal. As a still further example, it is checked whether the terminal has received an operation input by the user within a preset period of time (e.g., 5 minutes, etc.). If so, the terminal is determined to be an active terminal. If not, the terminal is determined to be an inactive terminal.

In some embodiments, determining whether the terminal is active and sending the above status information to the communication platform can be performed periodically. For example, the status of the terminal is checked every 5 minutes. When the terminal is determined to be active, the above status information is sent to the communication platform.

At S203, when the communication platform needs to send a message to the communication account, the communication platform sends the message according to the status information. That is, the message sent to an active terminal carries first notification instruction information instructing to output a strong notification message, and the message sent to an inactive terminal carries second notification instruction information instructing to output a weak notification message or to not output a notification message.

In some embodiments, the above inactive terminal is a terminal that may not currently be used by the user, or a terminal that has not sent the above status information to the communication platform within a preset period of time (e.g., 10 minutes, etc.). For example, the inactive terminal can be a terminal whose screen is locked, a terminal not in a full-screen operation, a terminal with a communication client locked, or a terminal that has not received an operation input by the user within a preset period of time. In some embodiments, the above inactive terminal may also be an active terminal before the procedure in S202, at which time such terminal can still send the above status information to the communication platform. That is, the communication platform may have received status information from a terminal that was active but is currently inactive. When the communication platform needs to send a message to the communication account, it may also determine whether a terminal is active or inactive according to the time at which the terminal sends the status information. For example, a terminal that has sent the status information within the preset period of time is determined to be an active terminal, while a terminal that did not send the status information within the preset period of time is determined to be an inactive terminal.

In some embodiments, multiple notification messages may have been preset in the terminals and the communication platform, such as, for example, a window notification, a sound notification, a vibration notification, a text notification, an image notification, etc. The first notification instruction information may include tag information marking the multiple notification messages. For example, the tag information of the first notification instruction information may mark all of the above notification messages. That is, the strong notification message includes the above multiple notification messages, such as including the window notification, the sound notification, the vibration notification, the text notification, and the image notification. The second notification instruction information may include tag information marking the multiple notification messages. For example, the tag information of the second notification instruction information may mark one or more notification messages. That is, the weak notification message includes one or more of the above multiple notification messages, such as including the vibration notification, the text notification, or the image notification.

If the second notification instruction information instructs to not output a notification message, the inactive terminal receiving the above message does not output any notification message. That is, when the inactive terminal receives the above message, it does not respond.

At S204, the active terminal outputs the strong notification message according to the first notification instruction information. For example, the strong notification message may include the window notification, the sound notification, the vibration notification, the text notification, the image notification, etc.

In some embodiments, when the second notification instruction information instructs to output the weak notification message, the inactive terminal outputs the weak notification message according to the second notification instruction information, as shown in S205 of FIG. 2. For example, the inactive terminal outputs the vibration notification, the text notification, or the image notification.

In some embodiments, the plurality of terminals includes multiple active terminals. The procedure in S203 of sending the message that carries the first notification instruction information by the communication platform to the active terminal may include the communication platform acquiring a time difference of each active terminal, and configuring the first notification instruction information for an active terminal that corresponds to the time difference of the active terminal. The time difference of the active terminal refers to a difference between a receiving time at which a status information sent by the active terminal is received by the communication platform and a time at which the communication platform needs to send a message to the communication account. A strength of the strong notification message output as instructed by the first notification instruction information corresponding to the time difference is inversely proportional to a time value of the time difference.

The communication platform sends each active terminal the message that carries the first notification instruction information configured for the active terminal.

Different active terminals may send the above status information to the communication platform at different sending times. For example, a first active terminal sends the above status information to the communication platform at a sending time of 10:00:00. It can be understood that the receiving time of the above status information by the communication platform from the first active terminal is 10:00:00. On the other hand, the sending time of the above status information to the communication platform from the second active terminal is 10:01:00. Assume the communication platform needs to send a message to the communication account at 10:02:00. That is, the time difference of the first active terminal is 2 minutes, and the time difference of the second active terminal is 1 minute. As a result, for the first active terminal, the communication platform may allocate a first notification instruction information that instructs to output a strong notification message with a lower strength, while for the second active terminal, the communication platform may allocate a first notification instruction information that instructs to output a strong notification message with a higher strength.

For example, the first notification instruction information allocated by the communication platform for the first active terminal instructs to output a strong notification message including a vibration notification, a text notification, and an image notification. The first notification instruction information allocated by the communication platform for the second active terminal instructs to output a strong notification message including a window notification, a sound notification, a vibration notification, a text notification, and an image notification.

The procedure at S204 can include that each active terminal outputs a strong notification message as instructed by the received first notification instruction information. For example, the first active terminal outputs a vibration notification, a text notification, and an image notification, and the second active terminal outputs a window notification, a sound notification, a vibration notification, a text notification, and an image notification.

In some embodiments, the plurality of terminals includes multiple inactive terminals. The procedure in S203 of sending the message that carries the second notification instruction information by the communication platform to the inactive terminal may include the communication platform acquiring a time difference of each inactive terminal, and configuring the second notification instruction information for an inactive terminal that corresponds to the time difference of the inactive terminal. The time difference of the inactive terminal refers to a difference between a receiving time at which a status information sent by the inactive terminal is received by the communication platform and a time at which the communication platform needs to send a message to the communication account. A strength of the weak notification message output as instructed by the second notification instruction information corresponding to the time difference is inversely proportional to a time value of the time difference.

The communication platform sends each inactive terminal the message that carries the second notification instruction information configured for the inactive terminal.

That is, before the procedure at S202, the inactive terminals may have also sent status information to the communication platform, i.e., the inactive terminals may have been active terminals before the procedure at S202. Different inactive terminals may send the above status information to the communication platform at different sending times. For example, a first inactive terminal sends the above status information to the communication platform at a sending time of 09:00:00. It can be understood that the receiving time of the above status information by the communication platform from the first inactive terminal is 09:00:00. On the other hand, the sending time of the above status information to the communication platform from the second inactive terminal is 09:01:00. Assume the communication platform needs to send a message to the communication account at 10:02:00. That is, the time difference of the first inactive terminal is 1 hour and 2 minutes, and the time difference of the second inactive terminal is 1 hour and 1 minute. As a result, for the first inactive terminal, the communication platform may allocate a second notification instruction information that instructs to output a weak notification message with a lower strength, while for the second inactive terminal, the communication platform may allocate a second notification instruction information that instructs to output a weak notification message with a higher strength.

For example, the second notification instruction information allocated by the communication platform for the first inactive terminal instructs to output a weak notification message including an image notification. The second notification instruction information allocated by the communication platform for the second inactive terminal instructs to output a weak notification message including a text notification and an image notification.

The procedure at S205 can also include that each inactive terminal outputs a weak notification message as instructed by the received second notification instruction information. For example, the first inactive terminal outputs an image notification, and the second inactive terminal outputs a text notification and an image notification.

According to the embodiments discussed above, terminals having different statuses can output different notification messages.

Figure 3:
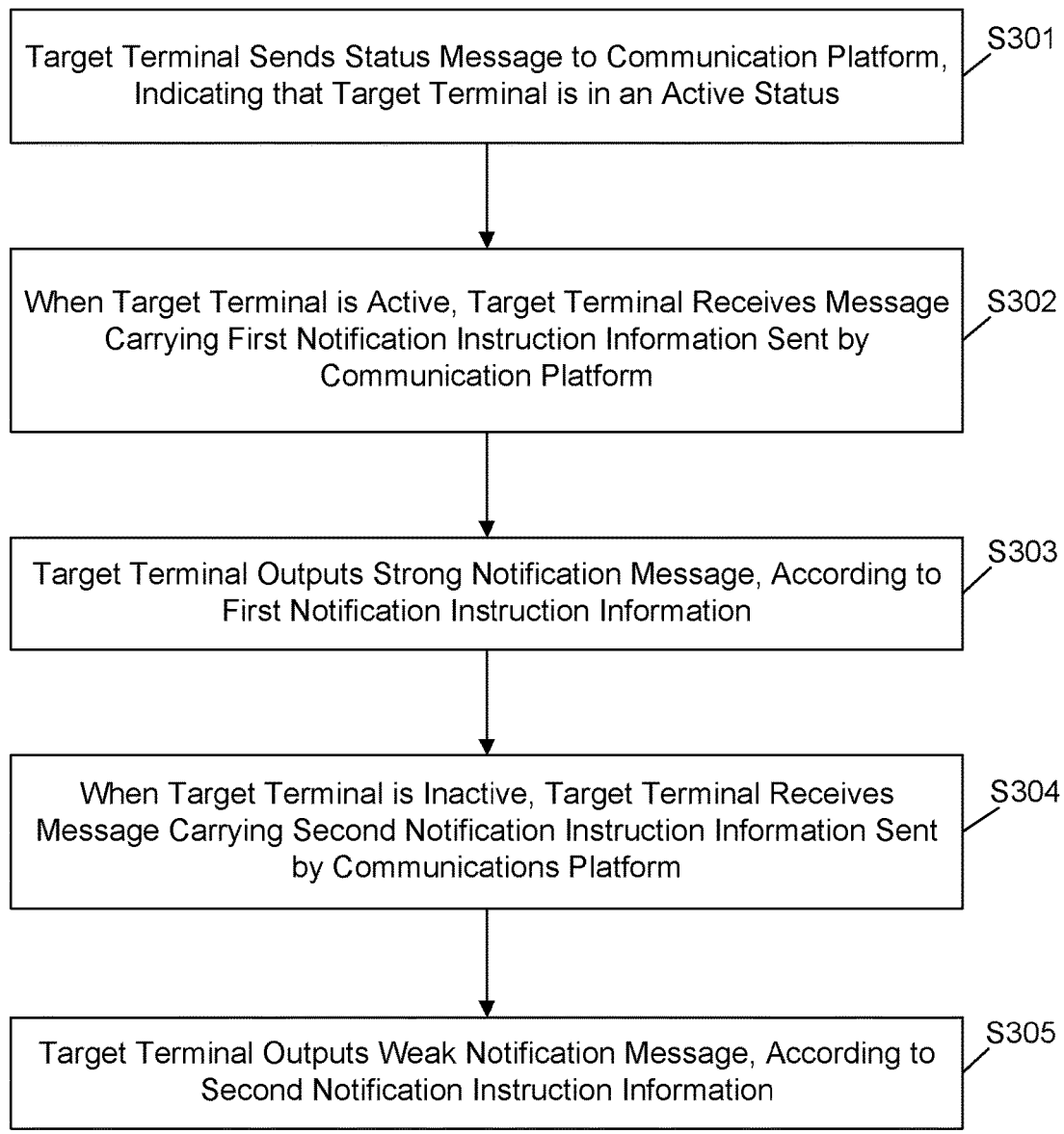
FIG. 3 shows a flow diagram of a message notification method for a communication account according yet another exemplary embodiment.

FIG. 3 shows a flow diagram of a further exemplary message notification method for a communication account consistent with embodiments of the disclosure. The method is applied to a target terminal, which is one of a plurality of terminals. As shown in FIG. 3, at S301, the target terminal sends status information to the communication platform. The status information indicates that the status of the target terminal is an active status.

That is, the target terminal is an active terminal or is being used by the user. The target terminal sends to the communication platform status information indicating that the status of the target terminal is an active status. For example, the target terminal is a terminal whose screen is not locked, the target terminal is in a full-screen operation, a communication client on the target terminal is unlocked, or the target terminal receives an operation input by the user within a preset period of time.

In some embodiments, the target terminal determines whether it is an active terminal. If so, the target terminal sends the communication platform the status information indicating the target terminal is active. As noted above, various methods can be used to determine whether the target terminal is active. For example, it is checked whether the screen of the target terminal is locked. If so, the target terminal is determined to be an inactive terminal. If not, the target terminal is determined to be an active terminal. As another example, it is checked whether the target terminal is in a full-screen operation. If so, the target terminal is determined to be an active terminal. If not, the target terminal is determined to be an inactive terminal. As a further example, it is checked whether the communication client on the target terminal is locked. If so, the target terminal is determined to be an inactive terminal. If not, the target terminal is determined to be an active terminal. As a still further example, it is checked whether the target terminal has received an operation input by the user within a preset period of time (e.g., 5 minutes, etc.). If so, the target terminal is determined to be an active terminal. If not, the target terminal is determined to be an inactive terminal.

In some embodiments, determining whether the target terminal is active and sending the above status information to the communication platform can be performed periodically. For example, the status of the target terminal is checked every 5 minutes. When the target terminal is determined to be active, the above status information is sent to the communication platform.

At S302, when the status of the target terminal is an active status, the target terminal receives the message sent by the communication platform that contains the first notification instruction information instructing to output a strong notification message.

In some embodiments, the communication platform may determine that the target terminal is currently active according to the receiving time at which the communication platform receives the status message sent by the target terminal, that is, the communication platform may determine that the target terminal is currently an active terminal. For example, the communication platform determines that the target terminal is an active terminal if the difference between the receiving time at which the communication platform receives the above status information sent by the target terminal and the time at which the communication platform needs to send a message to the communication account is within the preset period of time. For example, when the target terminal sends the above status information to the communication platform at 10:00:00, while communication platform needs to send the message to the communication account at 10:02:00, the communication platform can determine that the target terminal is currently an active terminal.

In some embodiments, the above message can be a message that the communication platform needs to send to the above communication account, e.g., a system message. The above message can also be a message forwarded by the communication platform from another communication account to the above-mentioned communication account. In some embodiments, the above strong notification message includes a window notification, a sound notification, a text notification, an image notification, and etc. The notification messages output by other terminals can be text notifications or image notifications.

At S303, the target terminal outputs the strong notification message according to the first notification instruction information. That is, when receiving the above message, the target terminal acquires the first notification instruction information, and outputs the strong notification message according to the first notification instruction information.

At S304, when the status of the target terminal is an inactive status, the target terminal receives the message sent by the communication platform that carries the second notification instruction information. The second notification instruction information instructs to output the weak notification message, or to indicate not to output a notification message.

For example, when the target terminal sends the above status information to the communication platform at 09:00:00, while the communication platform needs to send a message to the target terminal at 10:00:00, the communication platform determines that the target terminal is an inactive terminal. In some embodiments, the message received in the procedure at S302 and the message received in the procedure at S304 may be two different messages.

In some embodiments, the strong notification message has a greater notification effect to the user than the weak notification message. The strong notification message may consume larger power than the weak notification message. In some embodiments, multiple notification messages may have been preset in the target terminal and the communication platform, such as, for example, a window notification, a sound notification, a vibration notification, a text notification, and an image notification. The first notification instruction information may include tag information marking the multiple notification messages. For example, the tag information of the first notification instruction information may mark all of the above notification messages. That is, the strong notification message includes the above multiple notification messages, such as including the window notification, the sound notification, the vibration notification, the text notification, and the image notification. The second notification instruction information may include tag information marking the multiple notification messages. For example, the tag information of the second notification instruction information may mark one or more notification messages. That is, the weak notification message includes one or more of the above multiple notification messages, such as including the vibration notification, the text notification, or the image notification.

If the second notification instruction information instructs to not output a notification message, the inactive terminal receiving the above message does not output any notification message. That is, when the inactive terminal receives the above message, it does not respond.

When the second notification instruction information instructs to output a weak notification message, the method further includes that the target terminal outputs the weak notification message according to the second notification instruction information (S305 in FIG. 3). For example, the target terminal output the vibration notification, the text notification, or the image notification.

As described above, the target terminal sends the status information to the communication platform. The status information indicates that the status of the target terminal is an active status. When the target terminal is active, the target terminal outputs the strong notification message according to the received message sent by the communication platform that contains the second notification instruction information. When the target terminal is inactive, the target terminal receives the message sent by the communication platform that contains the second notification instruction information. According to the disclosure, terminals having different statuses can output different notification messages.

Device consistent with embodiments of the disclosure are described below, which can be used to execute the methods described above, and other methods consistent with embodiments of the disclosure.

Figure 4:
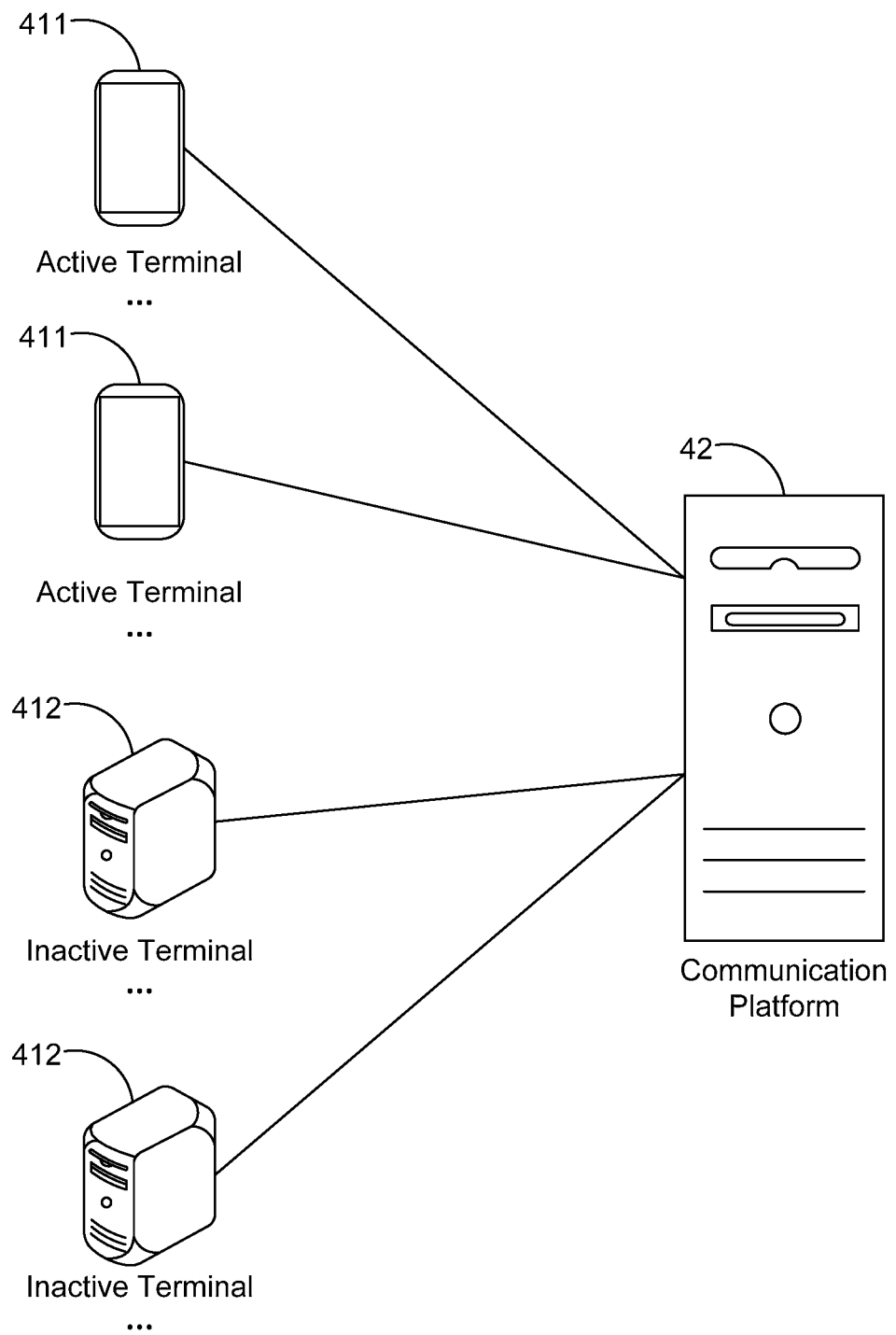
FIG. 4 schematically shows the structure of a message notification system for a communication account according to an exemplary embodiment.

FIG. 4 schematically shows the structure of an exemplary message notification system for a communication account consistent with embodiments of the disclosure. The system shown in FIG. 4 includes a plurality of terminals and a communication platform 42. The plurality of terminals log into the communication platform 42 using the communication account. The plurality of terminals includes at least one active terminal 411 and at least one inactive terminal 412.

The active terminal 411 sends status information to the communication platform 42 that indicates the active status of the active terminal 411. In some embodiments the active terminal 411 is a terminal that may be currently used by the user, for example, a terminal whose screen is not locked, a terminal in a full-screen operation, a terminal with a communication client unlocked, or a terminal that receives an operation input by the user within a preset period of time.

In some embodiments, each of the plurality of terminals individually determines whether it is an active terminal 411. If so, the active terminal 411 sends the communication platform 42 the status information indicating the active terminal 411 is active. As noted above, various methods can be used to determine whether the terminal is active. For example, it is checked whether the screen of the terminal is locked. If so, the terminal is determined to be an inactive terminal. If not, the terminal is determined to be an active terminal 411. As another example, it is checked whether the terminal is in a full-screen operation. If so, the terminal is determined to be an active terminal 411. If not, the terminal is determined to be an inactive terminal. As a further example, it is checked whether the communication client on the terminal is locked. If so, the terminal is determined to be an inactive terminal. If not, the terminal is determined to be an active terminal 411. As a still further example, it is checked whether the terminal has received an operation input by the user within a preset period of time (e.g., 4 minutes, etc.). If so, the terminal is determined to be an active terminal 411. If not, the terminal is determined to be an inactive terminal.

In some embodiments, determining whether the terminal is an active terminal 411 and sending the above status information to the communication platform 42 can be performed periodically. For example, the status of the terminal is checked every 4 minutes to see whether it is an active terminal 411. When the terminal is determined to be an active terminal 411, the above status information is sent to the communication platform 42.

When the communication platform 42 needs to send a message to the communication account, the communication platform 42 sends, according to the received status information, the message that carries a first notification instruction information to the active terminal 411, and sends the message that carries a second notification instruction information to the inactive terminal 412. In some embodiments, the first notification instruction information instructs to output a strong notification message, and the second notification instruction information instructs to output a weak notification message or to instruct not to output a notification message.

The above message can be a message that the communication platform 42 needs to send to the above-mentioned communication account, e.g., a system message, or can be a message forwarded by the communication platform 42 from another communication account to the above-mentioned communication account.

In some embodiments, the above inactive terminal 412 is a terminal that may not currently be used by the user, or a terminal that has not sent the above status information to the communication platform within a preset period of time (e.g., 10 minutes, etc.). For example, the inactive terminal 412 can be a terminal whose screen is locked, a terminal not in a full-screen operation, a terminal with a communication client locked, or a terminal that has not received an operation input by the user within a preset period of time. In some embodiments, the above inactive terminal may also be an active terminal before the active terminal 411 sends the status information to the communication plat 42, at which time the inactive terminal 412 was active and can still send the status information to the communication platform 42. That is, the communication platform 42 may have received status information from the inactive terminal 412 before it receives status information from the active terminal 411. When the communication platform 42 needs to send a message to the communication account, it may also determine whether a terminal is an active terminal 411 or an inactive 412 according to the time at which the terminal sends the status information. For example, a terminal that has sent the status information within the preset period of time is determined to be an active terminal 411, while a terminal that did not send the status information within the preset period of time is determined to be an inactive terminal 412.

In some embodiments, the strong notification message has a greater notification effect to the user than the weak notification message. The strong notification message may consume larger power than the weak notification message. For example, the strong notification messages may include a window notification, a sound notification, a text notification, an image notification, and etc. That is, the strong notification message may include a simultaneous output of a window notification, a sound notification, a text notification, an image notification, and etc. The weak notification message can be just a text notification or an image notification. That is, the weak notification message only outputs a text notification or an image notification.

The active terminal 411 is further configured to output the strong notification message according to the first notification instruction information.

When receiving the above message, the active terminal 411 acquires the first notification instruction information, and output the strong notification message according to the first notification instruction information. For example, the active terminal 411 may output a window notification, a sound notification, a text notification, an image notification, and etc.

Consistent with embodiments of the disclosure, there may be a plurality of active terminals 411, and each of the plurality of active terminals 411 may be configured as described above.

In some embodiments, when the second notification instruction information instructs to output a weak notification message, the inactive terminal 412 is configured to output the weak notification message according to the second notification instruction information. For example, the inactive terminal 412 may output a vibration notification, a text notification, or an image notification.

In some embodiments, the plurality of terminals includes a plurality of active terminals 411.

The communication platform 42 is further configured to acquire a time difference of each active terminal 411, and to configure the first notification instruction information that corresponds to that terminal's time difference for that active terminal 411. The time difference of the active terminal 411 refers to a difference between the receiving time at which the communication platform 42 receives the status information from that active terminal 411 and the time at which the communication platform 42 needs to send a message to the communication account. The strength of the strong notification message output as instructed by the first notification instruction information corresponding to the time difference inversely to a time value of the time difference.

The communication platform 42 is further configured to send each active terminal 411 the message that carries the first notification instruction information configured for that active terminal 411.

The active terminal 411 is further configured to output the strong notification message as instructed by the first notification instruction information according to the first notification instruction information received by the active terminal 411.

That is, different active terminals 411 may send the above status information to the communication platform 42 at different sending times. For example, a first active terminal 411 sends the above status information to the communication platform 42 at a sending time of 10:00:00. It can be understood that the receiving time of the above status information by the communication platform 42 from the first active terminal is 10:00:00. On the other hand, the sending time of the above status information to the communication platform from a second active terminal 411 is 10:01:00. Assume the communication platform 42 needs to send a message to the communication account at 10:02:00. That is, the time difference of the first active terminal 411 is 2 minutes, and the time difference of the second active terminal 411 is 1 minute. As a result, for the first active terminal 411, the communication platform 42 may allocate a first notification instruction information that instructs to output a strong notification message with a lower strength, while for the second active terminal 411, the communication platform 42 may allocate a first notification instruction information that instructs to output a strong notification message with a higher strength. For example, the first notification instruction information allocated by the communication platform 42 for the first active terminal 411 instructs to output a strong notification message including a vibration notification, a text notification, and an image notification. The first notification instruction information allocated by the communication platform 42 for the second active terminal 411 instructs to output a strong notification message including a window notification, a sound notification, a vibration notification, a text notification, and an image notification.

For example, the first active terminal 411 outputs a vibration notification, a text notification, and an image notification. The second active terminal 411 outputs a window notification, a sound notification, a vibration notification, a text notification, and an image notification.

In some embodiments, there are a plurality of inactive terminals 412.

The communication platform 42 acquires a time difference of each inactive terminal 412, and configures the second notification instruction information for an inactive terminal 412 that corresponds to the time difference of the inactive terminal 412. The time difference of the inactive terminal 412 refers to a difference between a receiving time at which a status information sent by the inactive terminal 412 is received by the communication platform 42 and a time at which the communication platform 42 needs to send a message to the communication account. A strength of the weak notification message output as instructed by the second notification instruction information corresponding to the time difference is inversely proportional to a time value of the time difference.

The communication platform 42 is further configured to send each inactive terminal 412 the message that carries the second notification instruction information configured for that inactive terminal 412.

The inactive terminal 412 is further configured to output the weak notification message as instructed by the second notification instruction information, according to the second notification instruction information received by the inactive terminal 412.

Before the active terminal 411 sends the above status information to the communication platform 42, the plurality of inactive terminals 412 may have also sent status information to the communication platform 42, i.e., the inactive terminals 412 may have been active terminals 411 before the above active terminal 411 sends the status information to the communication platform 42. Different inactive terminals 412 may send the above status information to the communication platform 42 at different sending times. For example, a first inactive terminal 412 sends the above status information to the communication platform 42 at a sending time of 09:00:00. It can be understood that the receiving time of the above status information by the communication platform 42 from the first inactive terminal 412 is 09:00:00. On the other hand, the sending time of the above status information to the communication platform 42 from a second inactive terminal 412 is 09:01:00. Assume the communication platform 42 needs to send a message to the communication account at 10:02:00. That is, the time difference of the first inactive terminal 412 is 1 hour and 2 minutes, and the time difference of the second inactive terminal 412 is 1 hour and 1 minute. As a result, for the first inactive terminal 412, the communication platform 42 may allocate a second notification instruction information that instructs to output a weak notification message with a lower strength, while for the second inactive terminal 412, the communication platform 42 may allocate a second notification instruction information that instructs to output a weak notification message with a higher strength. For example, the second notification instruction information allocated by the communication platform 42 for the first inactive terminal 412 instructs to output a weak notification message including an image notification. The second notification instruction information allocated by the communication platform 42 for the second inactive terminal 412 instructs to output a weak notification message including a text notification and an image notification.

For example, the first inactive terminal 412 outputs the image notification, while the second inactive terminal 412 outputs the text notification and the image notification.

As described above, the active terminal sends the communication platform the status information indicating the active status of the active terminal. According to the received status information, the communication platform sends the message that carries the first notification instruction information to the active terminal, and sends the message that carries the second notification instruction information to the inactive terminal in the plurality of terminals. The first notification instruction information instructs to output the strong notification message, and the second notification instruction information instructs to output the weak notification message or to not output a notification message. The active terminal outputs the strong notification message according to the first notification instruction information. Thus, terminals having different status can output different notification messages.

Figure 5:
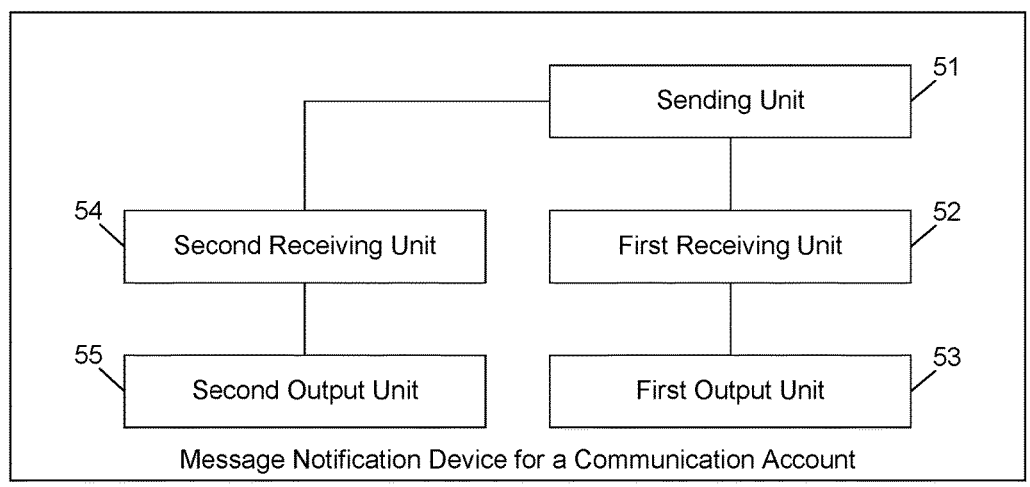
FIG. 5 schematically shows the structure of a message notification device for a communication account according to an exemplary embodiment.

FIG. 5 schematically shows a structure of an exemplary message notification device for a communication account consistent with embodiments of the disclosure. According to the disclosure, a plurality of terminals may log in a communication platform using the communication account. The device of FIG. 5 runs in one of the plurality of terminals. As shown in FIG. 5, the device includes a sending unit 51, a first receiving unit 52, a first output unit 53, and a second receiving unit 54.

The sending unit 51 is configured to send status information to the communication platform. The status information indicates that the status of the device is an active status.

The first receiving unit 52 is configured to receive a message containing a first notification instruction information sent by the communication platform, when the status of the device is the active status. The first notification message instructs to output a strong notification message.

In some embodiments, the communication platform determines the device is currently active according to a receiving time at which the above status sent by the device is received by the communication platform, i.e., determines that the device is currently an active terminal. For example, if a difference between the receiving time at which the above status information sent by the device is received by the communication platform and the time at which the communication platform needs to send the message to the communication account is within a preset period of time, the device is determined to be an active terminal. For example, if the sending time of the above status information sent to the communication platform by the device is 10:00:00, while the time at which the communication platform needs to send the above status information to the communication account is 10:02:00, the platform determines that the device is currently an active terminal.

The above message can be a message that the communication platform needs to send to the above-mentioned communication account, e.g., a system message, or can be a message forwarded by the communication platform from another communication account to the above-mentioned communication account. The strong notification message may include a window notification, a sound notification, a text notification, an image notification, and etc. The notification message output by another terminal may be a text notification or an image notification.

The first output unit 53 is configured to output the strong notification message according to the first notification instruction information.

When receiving the above message, the first output unit 53 may acquire the first notification instruction information, and output the strong notification message according to the first notification instruction information.

The second receiving unit 54 is configured to receive the message that carries the second notification instruction information sent by the communication platform when the status of the device is an inactive status. The second notification instruction information instructs to output of a weak notification message, or to not output a notification message.

For example, if the time at which the device sends the above status information to the communication platform is 09:00:00, while the time at which the communication platform needs to send the message to the communication account is 10:00:00, the communication platform determines that the device is currently an inactive terminal. The message received by the first receiving unit 52 and the message received by the second sending unit 54 may be two different messages.

In some embodiments, the strong notification message has a greater notification effect to the user than the weak notification message. The strong notification message may consume larger power than the weak notification message. In some embodiments, multiple notification messages may have been preset in the device and the communication platform, such as, for example, a window notification, a sound notification, a vibration notification, a text notification, and an image notification. The first notification instruction information may include tag information marking the multiple notification messages. For example, the tag information of the first notification instruction information may mark all of the above notification messages. That is, the strong notification message includes the above multiple notification messages, such as including the window notification, the sound notification, the vibration notification, the text notification, and the image notification. The second notification instruction information may include tag information marking the multiple notification messages. For example, the tag information of the second notification instruction information may mark one or more notification messages. That is, the weak notification message includes one or more of the above multiple notification messages, such as including the vibration notification, the text notification, or the image notification.

When the second notification instruction information instructs to not output a notification message, the inactive terminal does not output any notification message when it receives the above message. That is, the inactive terminal does not respond when receiving the above message.

In some embodiments, the device further includes a second output unit 55 configured to output the weak notification message according to the second notification instruction information, when the second notification instruction information instructs to output a weak notification message, e.g., to output the vibration notification, the text notification, or the image notification.

As described, the device sends the communication platform the status information indicating that the status of this active terminal is an active status. When the status of the said device is an active status, the device outputs the strong notification message according to the first notification instruction information sent by the communication platform. When the status of the device is an inactive status, the device receives the message sent by the communication platform that carries the second notification instruction information. Thus, a terminal can output different notification message when it is in different statuses.

As used in this disclosure, unless otherwise specified, "active" or "inactive" refers to the current status of a terminal, e.g., at or near the time when the communication platform determines the status of the terminal or when the communication platform needs to send a message to the communication account. An active terminal may be inactive before and may become inactive later. Similarly, an inactive terminal may be active before and may become active later.

One of ordinary skill in the art can understand that all or part of the processes described above can be finalized by certain hardware controlled by computer programs. For example, the program for performing the method shown in, e.g., FIG. 3 can be stored in a computer-readable storage medium, e.g., a storage medium of the terminal. The program may be executed by at least one processor of the terminal, so as to realize the procedure as shown in, e.g., FIG. 3. The storage media may be, for example, a read-only memory (ROM), a random access memory (RAM), a magnetic disk, or an optical disk.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A message notification method for a communication account of a communication platform performed at a computer server having one or more processors and memory storing a plurality of executable instructions to be performed by the one or more processors, the method comprising:

identifying a plurality of terminals that are currently logged into the communication account;

detecting operation status information of the plurality of terminals;

dividing the plurality of terminals into active terminals and inactive terminals in accordance with their respective operation status information;

acquiring, by the communication platform for each of the active terminals, a time difference between a receiving time at which the communication platform receives the operation status information sent by the corresponding active terminal and a time at which the communication platform needs to send a message to the communication account at the corresponding active terminal; and configuring, by the communication platform for each of the active terminals, first notification instruction information according to the corresponding time difference, wherein a strength of a notification message output at the corresponding active terminal as instructed by the corresponding first notification instruction information is inversely proportional to the corresponding time difference.

2. The method according to claim 1, further comprising:
sending, by the communication platform to each of the active terminals, a corresponding first message carrying the corresponding first notification instruction information.

3. The method according to claim 1, wherein a terminal is determined to be an inactive terminal when the terminal's screen is locked.

4. The method according to claim 1, wherein a terminal is determined to be an active terminal when the terminal's screen is in a full-screen operation.

5. The method according to claim 1, wherein the operation status information is first status information, the method further comprising:
acquiring, by the communication platform for each of the inactive terminals, a time difference between a receiving time at which the communication platform receives the operation status information previously sent by the corresponding inactive terminal and a time at which the communication platform needs to send a message to the communication account at the corresponding inactive terminal; and
configuring, by the communication platform for each of the inactive terminals, second notification instruction information according to the corresponding time difference,
wherein a strength of a notification message output at the corresponding inactive terminal as instructed by the corresponding second notification instruction information is inversely proportional to the corresponding time difference.

6. The method according to claim 5, further comprising:
sending, by the communication platform to each of the inactive terminals, the corresponding second message carrying the corresponding second notification instruction information.

7. A computer server having one or more processors, memory coupled to the one or more processors, and a plurality of executable instructions stored in the memory that, when executed by the one or more processors, cause the computer server to perform a message notification method for a communication account of a communication platform, wherein the plurality of executable instructions further comprise:
identifying a plurality of terminals that are currently logged into the communication account;
detecting operation status information of the plurality of terminals;
dividing the plurality of terminals into active terminals and inactive terminals in accordance with their respective operation status information;
acquiring, by the communication platform for each of the active terminals, a time difference between a receiving time at which the communication platform receives the operation status information sent by the corresponding active terminal and a time at which the communication platform needs to send a message to the communication account at the corresponding active terminal; and configuring, by the communication platform for each of the active terminals, first notification instruction information according to the corresponding time difference,
wherein a strength of a notification message output at the corresponding active terminal as instructed by the corresponding first notification instruction information is inversely proportional to the corresponding time difference.

8. The computer server according to claim 7, wherein the plurality of executable instructions further comprise:
sending, by the communication platform to each of the active terminals, a corresponding first message carrying the corresponding first notification instruction information.

9. The computer server according to claim 7, wherein a terminal is determined to be an inactive terminal when the terminal's screen is locked.

10. The computer server according to claim 7, wherein a terminal is determined to be an active terminal when the terminal's screen is in a full-screen operation.

11. The computer server according to claim 7, wherein the operation status information is first status information, and the plurality of executable instructions further comprise:
acquiring, by the communication platform for each of the inactive terminals, a time difference between a receiving time at which the communication platform receives the operation status information previously sent by the corresponding inactive terminal and a time at which the communication platform needs to send a message to the communication account at the corresponding inactive terminal; and
configuring, by the communication platform for each of the inactive terminals, second notification instruction information according to the corresponding time difference,
wherein a strength of a notification message output at the corresponding inactive terminal as instructed by the corresponding second notification instruction information is inversely proportional to the corresponding time difference.

12. The computer server according to claim 7, wherein the plurality of executable instructions further comprise:
sending, by the communication platform to each of the inactive terminals, the corresponding second message carrying the corresponding second notification instruction information.

13. A non-transitory computer readable storage medium storing a plurality of executable instructions that, when executed by a computer server having one or more processors, cause the one or more processors to a message notification method for a communication account of a communication platform, wherein the plurality of executable instructions further comprise:
identifying a plurality of terminals that are currently logged into the communication account;
detecting operation status information of the plurality of terminals;
dividing the plurality of terminals into active terminals and inactive terminals in accordance with their respective operation status information;
acquiring, by the communication platform for each of the active terminals, a time difference between a receiving time at which the communication platform receives the operation status information sent by the corresponding active terminal and a time at which the communication platform needs to send a message to the communication account at the corresponding active terminal; and configuring, by the communication platform for each of the active terminals, first notification instruction information according to the corresponding time difference,
wherein a strength of a notification message output at the corresponding active terminal as instructed by the corresponding first notification instruction information is inversely proportional to the corresponding time difference.

14. The non-transitory computer readable storage medium according to claim 13, wherein the plurality of executable instructions further comprise:
sending, by the communication platform to each of the active terminals, a corresponding first message carrying the corresponding first notification instruction information.

15. The non-transitory computer readable storage medium according to claim 13, wherein a terminal is determined to be an inactive terminal when the terminal's screen is locked.

16. The non-transitory computer readable storage medium according to claim 13, wherein a terminal is determined to be an active terminal when the terminal's screen is in a full-screen operation.

17. The non-transitory computer readable storage medium according to claim 13, wherein the operation status information is first status information, and the plurality of executable instructions further comprise:

acquiring, by the communication platform for each of the inactive terminals, a time difference between a receiving time at which the communication platform receives the operation status information previously sent by the corresponding inactive terminal and a time at which the communication platform needs to send a message to the communication account at the corresponding inactive terminal; and
configuring, by the communication platform for each of the inactive terminals, second notification instruction information according to the corresponding time difference,
wherein a strength of a notification message output at the corresponding inactive terminal as instructed by the corresponding second notification instruction information is inversely proportional to the corresponding time difference.

18. The non-transitory computer readable storage medium according to claim 17, wherein the plurality of executable instructions further comprise:
sending, by the communication platform to each of the inactive terminals, the corresponding second message carrying the corresponding second notification instruction information.

* * * * *